United States Patent
Highcock et al.

(10) Patent No.: US 7,288,584 B2
(45) Date of Patent: Oct. 30, 2007

(54) MIXING SCHEME AND PROCESS FOR THE PREPARATION OF A REFINISH COATING COMPOSITION

(75) Inventors: William James Highcock, Farnham Common (GB); Graham Stuart Kay, Slough (GB); David Robert Fenn, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 151 days.

(21) Appl. No.: 10/351,713

(22) Filed: Jan. 27, 2003

(65) Prior Publication Data

US 2003/0170395 A1 Sep. 11, 2003

Related U.S. Application Data

(60) Provisional application No. 60/352,929, filed on Jan. 29, 2002.

(51) Int. Cl.
  *B32B 9/04* (2006.01)
  *C08J 3/00* (2006.01)
  *C08K 3/34* (2006.01)
  *C08K 5/34* (2006.01)
  *C08L 33/00* (2006.01)

(52) U.S. Cl. ............... 524/104; 427/372.2; 427/385.5; 428/411.1; 524/211; 524/212; 524/215; 524/445; 524/492; 524/493; 524/494; 524/495; 524/496; 524/401; 524/501; 524/502; 524/556; 524/601; 524/599; 524/612

(58) Field of Classification Search ............... 524/401, 524/501, 211, 212, 215, 445, 492, 493, 494, 524/495, 496, 502, 556, 601, 599, 612, 104; 427/385.5, 372; 428/411.1
See application file for complete search history.

(56) References Cited

U.S. PATENT DOCUMENTS 2,255,263 A * 9/1941 Marcot .................. 106/421
3,790,396 A * 2/1974 Fitton .................... 106/463
4,383,068 A * 5/1983 Brandt ................... 524/196
4,540,734 A * 9/1985 Short et al. ............. 524/507
4,677,028 A * 6/1987 Heeringa et al. ....... 428/422.8
4,851,294 A * 7/1989 Buter et al. ............. 428/425.8
4,882,408 A * 11/1989 Blum ...................... 528/49
4,965,317 A * 10/1990 Kania et al. ............ 525/155
5,034,444 A * 7/1991 Yun et al. ............... 524/223
5,204,401 A * 4/1993 Anderson et al. ....... 524/441
5,820,925 A * 10/1998 Fenn et al. ............. 427/140

FOREIGN PATENT DOCUMENTS

DE    199 42 515 A1    3/2001
EP    1 152 041 A1    11/2001

* cited by examiner

*Primary Examiner*—Patrick Niland
(74) *Attorney, Agent, or Firm*—Carol A. Marmo; William J. Uhl

(57) ABSTRACT

The present invention refers to a mixing scheme containing a plurality of pigmented base paint compositions having defined colors and optionally one or more non-pigmented base paint compositions comprising at least one rheology controlled base paint composition containing at least one pigment selected from the group consisting of inorganic pigments, di-keto-pyrrolo-pyrrole type pigments, organic liquid crystal type pigments and carbon black and having the following rheology profile (1) an initial viscosity $V_1$ at 20° C. of 65 Pa s or greater when measured at a shear rate of $10^{-3}$ s$^{-1}$, (2) a viscosity $V_2$ at 20° C. when measured at a shear rate of $10^{-3}$ s$^{-1}$ immediately after subjecting to a shear rate of at least 15 s$^{-1}$ whereby the viscosity $V_2$ is 700 Pa s or less and is less than or equal to 70% of $V_1$;

(3) 24 hours after subjected by shaking to a shear rate of at least 15s$^{-1}$ a viscosity $V_3$ at 20° C. of at least 140% of $V_2$ and be at least 55 Pa s, to a process of preparing a refinish coating composition using the mixing scheme of the present invention, to a refinish coating compositions obtainable therefrom, to a process of coating a substrate using the refinish coating composition and to a coated substrate obtainable therefrom.

16 Claims, No Drawings

MIXING SCHEME AND PROCESS FOR THE PREPARATION OF A REFINISH COATING COMPOSITION

CROSS-REFERENCE TO RELATED APPLICATION

This application claims priority under 35 U.S.C. § 119 to Provisional Application Ser. No. 60/352,929, filed Jan. 29, 2002.

This invention relates to a mixing scheme comprising a collection of pigmented base paints, said base paints having specified Theological properties that can be employed in a process for preparation of a refinish coating composition. The invention also relates to said process, to coating compositions derived from the mixing scheme and to a process of coating and to the coated substrates.

The process of applying a coating composition to an already painted motor vehicle (including motor cycles) is known as refinishing. Refinishing is usually necessary after a vehicle, particularly motor cars, has been involved in an accident or sometimes to hide the effects of age. Coating compositions designed for refinishing are often also used for the painting of commercial vehicles, for example in the livery of their owners. This use is often referred to as Commercial Transport (CT) also known as Commercial Vehicles (CV).

Refinish paint is usually required to be an exact color match to the original paint color on the motor vehicle applied by the manufacturer and a refinisher is generally required to be able to match any vehicle requiring repair. As it is common for only a fraction of the vehicle to be repainted, the new coating is often seen alongside the original paint that it was designed to match. Thus the color of a refinish coating composition needs to be controlled much more precisely than most other coating compositions, for example architectural coatings. There are thousands of different colors which are either currently in use by motor vehicle manufacturers or which have been applied in the past to motor vehicles which are still on the road and which may require refinishing.

It is not feasible for the refinisher to stock all possible colors and so refinish paints are generally prepared by mixing a number of pigmented base paints in a small range of around 14 to 150 master colors. Certain of the base paints may contain pigments designed to give visual effects such as metallic or pearlescent effects. The base paints can be mixed together in predetermined proportions to obtain a coating composition that will provide a coating of any desired final color and/or effect.

Said mixing scheme comprises a selection of base paints which contain different pigment types resulting in different colors. The mixing scheme will consist of a number of base paints which can be mixed in varying amounts to give a large selection of colors. There may/may not also be included non pigmented base paints commonly known as mixing or blending clears on the mixing scheme.

In addition to the pigmented base paints, mixing clear(s) often alternatively known as blending clear(s) can be included in the mixing scheme. A mixing clear is essentially an un-pigmented base paint. It can comprise a different type of polymer from the pigmented base paints. The mixing clear is mixed with the pigmented base paints in order to achieve the desired pigment to binder ratio in the coating composition. The set of different pigmented base compositions and optional clear base compositions is herein referred to as a mixing scheme.

Several different mixing clears can be utilized to produce several different types of coating compositions from one mixing scheme. A set of base paints together with a set of formulations for producing the extensive range of colors and effects required is very expensive and time consuming to produce. For this reason, the use of different mixing clears to alter the properties of the final coating composition without having to alter the base paints can represent an important cost saving. For example a refinish basecoat and a refinish pigmented topcoat can be produced from the same mixing scheme by utilizing different mixing clears.

A topcoat system is one where the final layer of paint contains pigment and gives acceptable gloss, application and durability characteristics. Basecoat systems have a final layer of clear paint, commonly known as a clearcoat, on top of the pigmented color layer.

Alternatively an alkyd pigmented topcoat and a two pack polyurethane topcoat can be produced from the same mixing scheme by utilizing different mixing clears which may comprise of different resins such as alkyls, hydroxy functional acrylics, nitrocellulose, polyesters and/or chloroalkyd systems.

In order for the coating compositions obtained from a mixing scheme to be a precise match to the original paint, it is important that the dispersion of the pigment in each base paint is uniform and stable. One problem is that the effect of gravity may cause some pigments to settle out overtime. If the pigment concentration differs between the top and bottom of the can of paint there will be differences in resulting color which is unacceptable in the refinish industry. The re-incorporation of the settled pigment can be difficult and time consuming. In practice this problem is overcome by storing the base paints in a device, known as a mixing machine, that is used to regularly stir them. Typically the base paints should be stirred for 15 minutes every 24 hours.

It would be desirable if a mixing machine was not required. It is an expensive piece of equipment which takes up valuable space and energy in a refinish paint shop. Additionally, if the seal between the moving parts of the mixing machine and the base paint containers is poor, volatile components of the base paints can be lost leading to a change in pigment concentration over time. The periodical stirring of the base paints is dependent on the operator remembering to perform the action. This may lead to infrequent stirring of the paints. It is also a rather noisy process leading to noise pollution. A further disadvantage of using mixing stations is like any other machinery they may be subject to mechanical failure.

The process time for the repair of a vehicle is critical to the bodyshop. Process time being the time it takes from starting the repair until it is complete and the vehicle is ready to be returned to the owner. If during the repair process one of the cans of a specific color runs out it must be replaced on the mixing scheme by a full can and stirred well before use. It takes a certain period of time to stir this can in order to have consistent pigment concentration before its use. This can add significantly to the process time.

If periodical mixing does not occur regularly there is the possibility of pigments settling. This effect occurs as the density of the pigment may be higher than that of the paint and consequentially sink to the bottom. The level of settling of pigment on the bottom of the can will be related to pigment type and to the extent of period of time the paint remains unstirred. This leads to inconsistencies of pigment concentration in the can which results in color deviation which is unacceptable in the refinish market.

One way of making the dispersions of the pigments in the base paints more stable, and possibly negating the requirement for a mixing machine, is to increase the viscosity of the base paints, for example by reducing the solvent content or by utilizing higher molecular weight polymeric components. The higher viscosity counteracts the effect of gravity on the pigment, which is usually the most dense component in the base paint. However, if the viscosity becomes too high, it can become difficult to accurately dispense the required amount of each base paint. This too can lead to a poor color match with the original paint which is unacceptable in the refinish market.

Alternatively thixotropic agents can be added to the composition. Thixotropic agents form three-dimensional networks in the paint leading to a higher viscosity. However these networks are temporarily destroyed by shear forces, such as exerted by stirring or shaking the container, resulting in a lower viscosity. Once the shear force is removed the viscosity increases again over a period of time. Paints containing a thixotropic agent will increase in viscosity towards their initial viscosity after a period of time related to the composition and the thixotropic agent used. Thixotropic agents are usually used to promote sag resistance in coating compositions. For example in U.S. Pat. Nos. 4,311,622 and 4,965,317. It is known to use thixotropic agents in refinish coatings as shown by U.S. Pat. No. 4,383,068 normally with regards to sag resistance improvement, which is related to the application of the paint. One problem with thixotropic agents is that they can lead to unacceptable performance of the coating. For example they can impede flow leading to an uneven surface (often referred to as ripple or orange peel), dispensing inaccuracy and poor gloss which are all unacceptable in the refinish market. They can also disrupt the alignment of metallic flake pigments within the composition leading to poor metallic effects.

The object of the present invention is to provide a mixing scheme to be used in said process for the preparation of refinish coating compositions whereby reproducible color performance without the need for the base paints to be stirred is achieved and the resulting coating compositions have good flow, good gloss and good metallic, pearl and special pigment effects.

This object has been attained by a mixing scheme comprising pigmented base paint compositions which have not and do not require periodical stirring for the production of a refinish coating composition and a process for said composition.

The mixing scheme according to the present invention contains a plurality of pigmented base paint compositions having defined colors and optionally one or more non-pigmented base paint compositions comprising at least one rheology controlled base paint composition containing at least one pigment selected from the group consisting of inorganic pigments, di-keto-pyrrolo-pyrrole type pigments, organic liquid crystal type pigments and carbon black and having the following rheology profile (1) an initial viscosity $V_1$ at 20° C. of 65 Pa s or greater when measured at a shear rate of $10^{-3}$ s$^{-1}$, (2) a viscosity $V_2$ at 20° C. when measured at a shear rate of $10^{-3}$ s$^{-1}$ immediately after subjecting to a shear rate of at least 15 s$^{-3}$ whereby the viscosity $V_2$ is 700 Pa s or less and is less than or equal to 70% of $V_1$;

(3) 24 hours at rest after subjected to a shear rate of at least 15 s$^{-1}$ a viscosity $V_3$ at 20° C. of at least 140% of $V_2$ and be 55 Pa s or above.

Furthermore the present invention refers to a process for preparing a refinish automotive coating composition comprising:

(a) selecting a predetermined number of pigmented base paint compositions in predetermined amounts, whereby at least one of the pigmented base paint composition is a rheology controlled base paint composition as defined above and optionally a predetermined number of non-pigmented base paint compositions from the mixing scheme of the present invention so that the refinish coating composition matches a predetermined colour after mixing; and (b) mixing the selected base paint compositions.

According to an other aspect the present invention is directed to a refinish automotive coating composition obtainable by the process of the present invention and to a process for coating a substrate comprising applying the refinish automotive coating composition of the present invention onto a substrate and allowing or causing the coating to dry or cure.

Preferably the mixing scheme of the present invention contains at least two, three, four, five, six, seven or more rheology controlled base paint compositions as defined above.

The viscosity can be conveniently measured using a Bohlin CVO 120 air-bearing instrument with Peltier electronic temperature control with the 4°/40 mm cone and temperature mode set at 20° C. The Log Ramp sweep set from 0.01 Pa to 10 Pa over a time period of 120 seconds with 30 separate readings taken. The pre-shear and yield analysis options should be set to OFF.

The initial viscosity, $V_1$, is measured on a sample of base paint composition which has previously been undisturbed for a period of 2 weeks.

The viscosity after shear, $V_2$, is determined as follows. A container between 250 ml and 5 liters which is no greater than 90% filled with the base paint composition that has previously been undisturbed for 2 weeks before being subjected to a shear rate of at least 15 s$^{-1}$ which is equivalent to approximately 10 vigorous shakes over a period of 5 seconds. A sample is then removed and the viscosity measured. After shaking, the base paint can be left undisturbed and the increase in viscosity measured by removing a sample after a certain period and the viscosity measured. Typically samples can be removed 1, 2, 4, 6 and 24 hours after being subjected to shear.

According to a preferred embodiment of the present invention the initial viscosity $V_1$ of the rheology controlled base paint compositions at 20° C. when measured at a shear rate of $10^{-3}$ s$^{-1}$ is 65 Pa s or greater, preferably above 80 Pa s more preferably above 100 Pa s, and/or the viscosity after shear $V_2$ when measured at a shear rate of $10^{-3}$ s$^{-1}$ is 700 Pa s or less, preferably 400 Pa s or less, more preferably 200 Pa s or less and most preferably 100 Pa s or less.

The viscosity $V_2$ of the rheology controlled base paint compositions after being subjected to a shear rate of at least 15 s$^{-1}$ is 70% or less, preferably 50% or less, most preferably 30% or less of the initial viscosity $V_1$ when measured at a shear rate of $10^{-3}$ s$^{-1}$.

The rheology controlled base paint compositions have a viscosity $V_3$ after being subjected to shear of at least 140% of $V_2$ within 24 hours at rest after being subjected to shear, preferably within 12 hours, more preferably within 6 hours and most preferably within 3 hours and have a viscosity of 55 Pa s or greater, preferably 80 Pa s or greater and most preferably 100 Pa s or greater.

More preferably, the rheology controlled base paint compositions have, a viscosity $V_3$ after being subjected to shear of at least 155% of $V_2$ within 24 hours after being subjected to shaking preferably within 12 hours, more preferably within 6 hours and most preferably within 3 hours and have a viscosity of 55 Pa s or greater, preferably 80 Pa s or greater and most preferably 100 Pa (s) or greater.

Even more preferably the rheology controlled base paint compositions have, a viscosity $V_3$ after being subjected to shear of at least 175% of $V_2$ within 24 hours after being subjected to shaking preferably within 12 hours, more preferably within 6 hours and most preferably within 3 hours and be 55 Pa s or greater, preferably 80 Pa s or greater and most preferably 100 Pa s or greater.

Most preferably, rheology controlled base paint compositions have, a viscosity $V_3$ after being subjected to shear of at least 190% of $V_2$ within 168 hours after being subjected to shaking preferably within 24 hours, more preferably within 12 hours and most preferably within 6 hours and be 55 Pa s or greater, preferably 80 Pa s or greater and most preferably 100 Pa s or greater.

The pigmented base paints in a mixing scheme may contain any pigments useful for refinish paints, and an enormous number are known and used. Examples of suitable pigments include Sicopal Yellow L1100 (trademark of BASF), Ti-Pure R960 (trademark of Du Pont), Novoperm Red HFT (trademark of Clariant), Heliogen Blue L7101F (trademark of BASF), Monastral Green GNX-C (trademark of Zeneca) and FW200 powder (trademark of Degussa). The mixing scheme may include organic and inorganic pigment types including aluminums and pearlescents for example Stapa metallic R507 (trade name of Eckart), and Mearlin Exterior Super Gold (trademark of Engelhard).

Preferred pigments to be used in the rheology controlled base paint compositions for the mixing scheme according to the present invention are:

(1) Pigment White—pigments which are classed as Pigment White in the Colour Index classification published by the Society of Dyers and Colourists, American Association of Textile Chemists and Colourists which is commonly used in colour definition. Examples of this type are Titane RHD2 (Trade name of Huntsman Tioxide), Tioxide (Tradename of Huntsman Tioxide), Tipure R960.09 (Trade name of Dupont), Tiona RCL 472 (trade name of Millenium chemicals) and UV Titan L530 (tradename of Kemira) which are of titanium dioxide type chemistry.

(2) Pigment Black—pigments which are classed as Pigment Black in the Colour Index classification published by the Society of Dyers and Colourists, American Association of Textile Chemists and Colourists which is commonly used in colour definition. Examples of this type are FW200 Powder (trade name of Degussa), Statex N550 Beads (trade name of Selvaco), Graphitan 7525 (tradename of Ciba Speciality Chemicals) and FW200 Beads (trade name of Degussa) which are of carbon black chemistry type. (3) Pigment Metal—pigments which are classed as Pigment Metal in the Colour Index classification published by the Society of Dyers and Colourists, American Association of Textile Chemists and Colourists which is commonly used in colour definition. Metallic effect pigments are usually small metallic platelets, of various shapes and sizes with and without additional coating(s). Examples of this type are Sparkle Silver Premier E504AR, Sparkle Silver Premier 2559AR, Silver Sparkle E2558AR (trade names of Silberline), Stapa Mettalux R807, Stapa Metallux R507, Stapa Metallux R474, Stapa Metallux R672 (trade names for Eckart) and Alpaste 8160 N-AR (trade name for Alcon Toyo).

(4) Pearlescent pigments—thin platelets, usually made of natural mica or synthetically produced substrates, of low refractive index which are coated with thin layers of titanium oxide and/or other metal oxides with high refractive index (such as aluminum, iron, chromium and/or cobalt) with or without extra coatings consisting of other colourants (e.g carbon black and/or others) and/or other metals. Various metal oxides and/or colourants can also be used in combination layers to achieve special colour effects. Examples of this type are Iriodin 103 Rutile Silver, Iriodin 121 Rutile Luster Satin, Iriodin 225 Rutile Blue pearl, Iriodin 504 Red (trade names of Merck) and Mearlin Exterior Supergold 239Z (trade name of Mearl).

(5) Pigment Red of iron oxide type pigments which are classed as Pigment Red in the Colour Index classification published by the Society of Dyers and Colourists, American Association of Textile Chemists and Colourists which is commonly used in colour definition and/or Pigment Yellow of iron oxide type pigments which are classed as Pigment Yellow in the Colour Index classification published by the Society of Dyers and Colourists, American Association of Textile Chemists and Colourists which is commonly used in colour definition. Examples of this type are Bayferrox Red 130 (trade name of Bayer) and Bayferrox Yellow 3910 (trade name of Bayer).

(6) Pigment Red of lead chromate type pigments which are classed as Pigment Red in the Colour Index classification published by the Society of Dyers and Colourists, American Association of Textile Chemists and Colourists which is commonly used in colour definition and/or Pigment Yellow of lead chromate pigments which are classed as Pigment Yellow in the Colour Index classification published by the Society of Dyers and Colourists, American Association of Textile Chemists and Colourists which is commonly used in colour definition. Examples of this type are Sicomin Red L3035S and Sicomin Yellow L1835S and Sicomin Yellow L1635S (trade names of BASF).

(7) Pigment Yellow of bismuth vanadate type pigments which are classed as Pigment Yellow in the Colour Index classification published by the Society of Dyers and Colourists, American Association of Textile Chemists and Colourists which is commonly used in colour definition. An example of this type is Sicopal Yellow L1100 (trade name of BASF).

(8) Pigment Red of di keto-pyrrolo-pyrolle type pigments which are classed as Pigment Red in the Colour Index classification published by the Society of Dyers and Colourists, American Association of Textile Chemists and Colourists which is commonly used in colour. An example of this type is Irgazin Red BO (trade name of Ciba).

(9) Other special effect pigment types such as ChromaFlair (™) flex, Variochrome (trade name of BASF) and organic liquid crystals eg Helicone (™ of Wacker Chemie), pigmented coated silica particles e.g. ColorStream™ (EM), pigmented coated aluminum oxide flakes, e.g Xirallic™ (EM), vacuum metallized flake (VMF technology), e.g. Strabrite (trade name of Silberline), polyester holographic metallized flakes e.g. Spectratek™ and metallized glass flakes e.g. Metashine and Crystal Star™ (Toyo)

Thixotropic agents may be included as a component of the rheology controlled base paint compositions. The type and level of thixotropic agent is selected such that the base paints have the previously stated viscosity profile. If the viscosity is below 65 Pa s when measured at a shear rate of $10^{-3}$ s$^{-1}$ a higher density pigment may settle to the bottom of the paint. More unusually if the pigment density was lower than that of the paint mixture it would float to the surface.

Achievement of this claimed rheology profile ensures that the pigments in the base paints are resistant to settlement but allows the base paints to be accurately dispensed after brief exposure to a low rate of shear.

Inorganic and organic pigments have different physical characteristics when utilised in paint. Inorganic pigments tend to have higher densities and are relatively large in particle size when dispersed. The particle size and density of the pigment influences the levels and type of thixotropic agent utilised in order to dispense of the requirement for periodical stirring with the base paints having the associated rheology profile of this invention. Usually a thixotropic additive will be required for particle sizes over 0.05 micrometers. A person skilled in the art would be capable of deducing addition levels of thixotropic additive in order to observe the claimed properties.

Examples of suitable thixotropic agents include hydrogenated castor oils, pyrogenic silica, modified montmorillonite clays, amino styrenated acrylics, calcium sulphonates and polyureas.

Thixotropic agents can be used to get the desired effect of shear thinning and rebuild characteristics within the paint. Preferably the thixotropic agent is a polyurea.

Polyureas are species containing a plurality of urea groups. Urea groups can be produced by the reaction between an isocyanate group and a primary or secondary amine group. Polyurea thixotropic agents are well known. Examples are disclosed in U.S. Pat. Nos. 3,893,956, 4,311,622, 4,314,924, 4,383,068, 4,522,986, 4,540,734, 4,677,028, 4,851,294, 4,882,408 and WO 9,422,968.

The polyurea thixotropic agent can be a urea containing resin, for example an acrylic resin or a polyester resin. Urea containing resins can be produced by reacting a primary or secondary amine functional resin with a monoisocyanate or by reacting an isocyanate functional resin with a primary or secondary amine. Examples of polymeric urea containing thixotropic agents are disclosed in U.S. Pat. No. 4,965,317.

Preferably the polyurea thixotropic agent is the reaction product of a polyisocyanate, a primary or secondary monoamine and optionally a primary and/or secondary diamine or the reaction product of a primary and/or secondary diamine, a monoisocyanate and optionally a polyisocyanate.

Polyisocyanates include aliphatic diisocyanates such as hexamethylene diisocyanate, isophorone diisocyanate, meta-tetramethylxylenediisocyanate (available commercially as TMXDI from Cytec Industries), aromatic diisocyanates such as toluene diisocyanate and 4,4'-diisocyanato-diphenylmethane, adducts of diisocyanates and polyols such as the reaction product of TMXDI and trimethylol propane (available commercially as Cythane 3174 from Cytec Industries), and dimers and trimers of diisocyanates such as the isocyanurate trimer of hexamethylene diisocyanate (available commercially as HDT 90 from Rhodia) and the uretdione dimer of hexamethylene diisocyanate (available commercially as Desmodur 3400 from Bayer).

Primary or secondary monoamines include benzylamine, ethylamine, n-propylamine, isopropylamine, n-butylamine, iso-butylamine tert.-butylamine, cyclohexylamine, dibutylamine, diethylamine and diethanolamine Primary and/or secondary diamines include 1,6-hexanediamine, isophoronediamine, 4,4;-diamine-diphenylmethane, N,N-dimethyl-4,4'-diaminodiphenylmethane and m-xylenediamine.

Examples of monoisocyanates include butylisocyanate, hexylisocyanate and phenyl isocyanate.

Examples of commercially available thixotropic agents are Ircogel 905 (Lubrizol), Claytone HY available from Southern Clay Inc., Claytone HT available from Southern Clay Inc., Trothix 150ACS available from Troy UK, Trothix Antisag 4 available from Troy UK, Ser-ad FX 2050 available from Condea, Borchigel Thixo A available from Borchers, Byk 411 available from Byk Chemie, and Solthix 250 available from Avecia.

The level of thixotropic additive used is dependant on the paint composition. Preferably some of the base paints contain from 0 to 5% of thixotropic additive by weight on total solids content, more preferably 0.05 to 1%, even more preferably 0.075% to 0.75%. A person skilled in the art would be able to deduce suitable addition levels.

The rheology controlled base paint compositions can also comprise one or more resins. Examples of suitable resins include acrylic resins, polyester resins, polyurethane resins, epoxy resins, polyether resins and alkyd resins. Preferably the base paints comprise one or more acrylic resins and/or one or more polyester resins.

The resin component of the base paints can be in dispersed or dissolved form. Preferably they are dissolved in one or more organic solvents.

Preferably the rheology controlled base paint compositions can also comprise one or more volatile solvents. The solvent can be any solvent in which the various components of the base paints can be dissolved or dispersed. It can be an aliphatic or aromatic hydrocarbon such as Solvesso 100 (trademark), toluene or xylene, an alcohol such as butanol or isopropanol, an ester such as butyl acetate or ethyl acetate, a ketone such as methyl isobutyl ketone or methyl amyl ketone, an ether, an ether-alcohol or an ether-ester, or a mixture of any of these.

The rheology controlled base paint compositions can also contain other conventional paint additives such as pigment dispersants, reactive diluents, catalysts, UV/HALS additives and flow aids.

A coating composition can be prepared by mixing a blending clear with one or more base paints or using a base paint alone if at a satisfactory pigment to binder ratio or resin coating composition to allow acceptable application properties. The pigment to binder ratio in the coating composition at which good gloss and opacity are achieved determines the amount of mixing clear that needs to be added. The higher the pigment to binder ratio in the base paints, the higher the ratio of resin from mixing clear to resin from base paints in the coating composition. A high ratio of resin from mixing clear to resin from base paints gives maximum scope for deriving different classes of coating composition from one set of base paints through the use of different mixing clears. In practice, the upper limit of pigment to binder ratio is determined by the need for the base paints to be accurately dispensed. If the pigment to binder content is too high the base paints become very viscous or paste like and accurate dispensing is difficult. The viscosity can be reduced by the addition of volatile solvent. However, high levels of volatile solvent can lead to unstable dispersions of the pigments. High levels of volatile solvent are also undesirable since many coating compositions are required to have low volatile organic solvent contents in order to comply with legislation.

Preferably the base paints have pigment to binder ratios of from 1:0.5 to 1:250 (for example would be a reduced basic to allow accurate dispensing of trace amounts of color) by weight, more preferable 1:0.5 to 1:150 and most preferably 1:0.5 to 1:10.

The mixing clear comprises one or more resins that can be the same or different from polymers in the base paints. Examples of suitable resins include acrylic resins, polyester resins, polyurethane resins epoxy resins, cellulose acetate butyrate resins, polyether resins and alkyd resins. Preferably the mixing clear comprises one or more acrylic resins and/or one or more polyester resins.

The mixing clear usually also comprises one or more volatile solvents. The volatile solvent can be any of those mentioned above in relation to the pigmented base paints.

The mixing clear can also contain other conventional paint additives such as reactive diluents, catalysts, UV/HALS additives waxes and flow aids.

Acrylic resins are derived from polymerisable ethylenically unsaturated monomers such as vinyl or acrylic monomers.

Whenever referred to herein, the term acrylic monomer refers to esters of acrylic or methacrylic acid. The term (meth) acrylate refers to both the acrylate and methacrylate equally and the term (meth) acrylic acid refers to acrylic or methacrylic acid equally.

Examples of suitable vinyl monomers are styrene and methylstyrene. Examples of suitable acrylic monomers are esters of (meth) acrylic acid such as methyl (meth) acrylate, ethyl (meth) acrylate, n-butyl (meth) acrylate, t-butyl (meth) acrylate, n-propyl (meth) acrylate, isobornyl (meth)acrylate and dimethylaminoethyl methacrylate.

It is also possible to include certain monomers that will result in the acrylic resin carrying functional groups that can be utilized in crosslinking reactions. Suitable functional groups include hydroxyl groups, carboxylic acid groups, amine groups, acetoacetate groups and epoxy groups.

Examples of monomers carrying hydroxyl groups are vinyl alcohol, hydroxy ethyl (meth) acrylate, hydroxy butyl (meth) acrylate and hydroxy propyl (meth) acrylate.

Other examples of suitable hydroxyl functional monomers are the reaction products of glycidyl (meth) acrylate with mono-carboxylic acids, such as versatic acid and the reaction product of (meth) acrylic acid with monoepoxy compounds such as Cardura E10 (the glycidyl ester of versatic acid; trade mark of Shell).

An example of a monomer carrying a carboxylic acid group is (meth) acrylic acid. An example of a monomer carrying an amine groups is tertiary-butyl aminoethyl (meth) acrylate. An example of a monomer carrying a glycidyl group is glycidyl (meth) acrylate. An example of a monomer carrying an acetoacetate group is acetoacetyl (meth) acrylate.

It is also possible to react certain functional groups with other compound so as to modify the polymer. For example, acid groups on the polymer can be reacted with glycidyl functional compounds such as the glycidyl ester of versatic acid (Cardura E10 from Shell) and epoxy groups on the polymer can be reacted with an acid functional compound, for example versatic acid.

Preferred acrylic resins have a number average molecular weight as measured by gel permeation chromatography of 700 to 1,000 000, more preferably 1,000 to 5,000.

Preferred acrylic resins have a theoretical glass transition temperature (Fox Tg) of 0 to 80° C., more preferably 20 to 70° C.

Polyesters can be prepared from polybasic acids and polyhydroxy compounds.

Polybasic acids are compounds having two or more carboxylic acid groups or an equivalent number of anhydride groups (on the basis that one anhydride group is equivalent to two acid groups). Such polybasic acids are well known in the polyester art. Examples of suitable polybasic acids are C1-6 alkane dioic acids such as adipic acid or hexanedioic acid, cycloaliphatic acids such as hexahydrophthalic acid, unsaturated alkane dioic acids such as fumaric or maleic acids, dimer acids, and aromatic acids such as phthalic acid. Their equivalent anhydrides such as maleic anhydride or phthalic anhydride can also be used.

Polyhydroxy compounds are compounds having two or more hydroxyl groups and are well known in the polyester art. Examples of suitable polyhydroxy compounds are trimethylol propane, glycerol, neopentyl glycol cyclohexane dimethanol and pentaerithritol.

Preferably the polyester has a number average molecular weight of 600 to 10,000, more preferably 600 to 5,000.

When the coating composition is a basecoat, it is preferable that the mixing clear comprises one or more cellulose acetate butyrate resins. A wide range of cellulose acetate butyrate resins are available from Eastman Chemical Company.

When the coating composition is a pigmented topcoat, it is preferable that the mixing clear comprises a resin having functional groups that can be utilised in crosslinking reactions. More preferably the mixing clear and the base paints comprises resins having functional groups that can be utilised in crosslinking reactions.

Preferably the mixing clear comprises a resin having hydroxyl groups. More preferably the mixing clear and the pigmented base paints comprises resins having hydroxyl groups. Preferably the resins containing hydroxyl groups have a hydroxyl value of 5 to 500 mg KOH/g, more preferably 50 to 250.

When the mixing clear and/or the pigmented base paints comprise a resin having functional groups that can be utilised in crosslinking reactions, the coating composition can additionally comprise a hardener. The hardener comprises a crosslinker. A crosslinker is a species bearing a plurality of functional groups that will react with the functional groups on the resin.

When the resin has acetoacetate functional groups suitable crosslinkers include polyamines. Polyamines are compounds containing at least two primary and/or secondary amine groups per molecule. Examples of polyamines are the EPI-CURE (TM) range of polyamines available from Shell Chemicals. The amine groups can be blocked, for example by reacting primary amine groups with aldehydes or ketones. Examples of blocked polyamines are Desmophen LS 2965 and Desmophen LS 2142 available from Bayer.

When the resin has epoxy groups suitable crosslinkers include polyamines and amine functional polyamides and acids. Polyamides are obtained by reacting dimerized fatty acids with polyamines. Examples of polyamides include the EPI-CURE (TM) range of polyamides available from Shell Chemicals.

Preferably the mixing clear or the base paints contains hydroxyl groups and the crosslinker is a polyisocyanate.

Particularly preferred polyisocyanates for use as crosslinkers include the isocyanurate trimers, allophanates and uretdiones of aliphatic diisocyanates as well as the reaction products of these diisocyanates with polyols. Polyols are compounds having three or more hydroxyl groups. Suitable polyols include trimethylol propane, glycerol and pentaerithritol. Many such polyisocyanates are commercially available, for example under the Desmodur trademark from Bayer or the Tolonate trade mark from Rhodia.

Polyisocyanate crosslinkers are preferably used in an amount such that the ratio of isocyanate groups on the polyisocyanate to the total number of hydroxyl groups in the composition is in the range 0.7:1 to 1.4:1, more preferably 0.8:1 to 1.3:1.

The hardener can also comprise one or more volatile solvents. The volatile solvent can be any of those mentioned above in relation to the pigmented base paints.

The hardener can also contain other conventional paint additives such as catalysts, UV/HAL additives, water scavengers and flow aids.

As well as any volatile solvent from the pigmented base paints, mixing clear and hardener, the coating composition can also comprise additional volatile solvent. The additional volatile solvent can be any of those mentioned above in relation to the pigmented base paints Additional volatile solvent can be added to the coating composition to reduce the viscosity and so improve the application properties, particularly when the composition is applied by spraying.

The preparation of the coating composition can be carried out by selecting one or more rheology controlled base paint compositions(s) and optionally other pigmented base paint compositions according to the required color, subjecting the selected pigmented base paint compositions(s) to shear, for example by briefly shaking the containers by hand, weighing out pre-determined amounts of the base paints according to the required color, mixing the base paints with a mixing clear and any hardener and/or additional volatile solvent and stirring the mixture to ensure that it is uniform.

The pigmented base paint compositions which need to be selected, and the amounts that are required to provide an accurate match to a color, for example the color of a motor vehicle, can be determined in advance. The recipe describing the base paints and amounts required can be provided to the end user by any suitable means, for example in printed form, by micro-fiche or as a computer database.

The coating can be applied to a substrate by conventional means such as brushing, aerosol, rollercoating or spraying, preferably by spraying. The compositions are usually applied over one or more layers of primer or undercoat (which may also be prepared from said mixing bases).

The applied refinish coating can be allowed to dry and cure at ambient temperature or alternatively the coating can be baked at elevated temperatures, for example 50-120° C. for 5 to 120 minutes to accelerate the drying and any curing.

According to the present invention there is also provided a coated motor vehicle obtainable by the process. The coating composition can be applied to the surface of a substrate and then allowed or caused to dry and cure. According to the present invention there is provided a process for coating a substrate which comprises the steps of applying a layer of coating composition according to the present invention to a surface of the substrate and thereafter causing or allowing the layer to cure.

The process can consist of preparation of the panel surface by methods such as flatting, cleaning and masking areas not to be painted. Flatting can be carried out wet or dry and serves two purposes. To obtain a level surface and provide a good surface for intercoat adhesion.

The first paint used maybe an undercoat or primer. Depending on the type of repair and substrate being repaired e.g. an etch primer paint may be applied before the undercoat. This could be followed by a colored basecoat prepared from the aforementioned mixing scheme. The mixing scheme can be used to provide a direct gloss finish at this point or a clearcoat may be layered on top of the basecoat to give a high gloss finish. Between each of these stages either a bake or a flash off period will/maybe required to allow excess solvent to evaporate. Depending on which product type used a product data sheet will be used to establish which gun set up, activation ratio, application method and film thickness to use for optimum results utilizing this process and products.

In producing the basecoat from the mixing scheme frequently a specified level of blending clear is added in order to apply the paint in a suitable manner. The basecoat may also be activated and thinned before application.

The substrate can be for example, metal, plastic, wood or glass. The compositions are particularly useful for refinishing motor vehicles. The base paints can be used for either direct gloss, matt and/or basecoat followed by clearcoat systems.

The applied layer can be allowed to cure at ambient temperature in the case where the hydroxyl polymer and the crosslinker react together at ambient temperatures. This is generally the case for example when the crosslinker is an isocyanate. Alternatively the layer can be baked at elevated temperatures, for example 50-120° C., either to accelerate curing or to cause curing when the crosslinker will only react with the polymer at elevated temperatures. This is generally the case when the crosslinker is a blocked polyisocyanate or a melamine formaldehyde.

One or more further coatings such as a clearcoat may be applied on top of the applied coating. Further coatings can be applied before or after the claimed coating has been allowed to dry or cure.

The invention is illustrated by the following examples.

EXPERIMENT 1

Sample 1=P425-900+0.3% Byk 410 (by weight) as supplied by Byk Chemie.

P425-900 is commercially available from ICI Autocolor (now trading as PPG Industries)

TABLE 1

| Number of shakes | Time for Shakes (s) | Viscosity (Pa s) |
|---|---|---|
| 5 | 5 | 141.5 |
| 5 | 10 | 181.1 |
| 10 | 5 | 131.6 |

The above results indicate that a force of approximately 5 shakes in 5 seconds is required to break down the body of the paint to allow acceptable application characteristics.

To establish a representative shear rate for the level required for the paint to be used in a body shop the following measurements were obtained.

TABLE 2

| Time | Shear Rate ($s^{-1}$) | Viscosity (Pa s) |
|---|---|---|
| 10 sec | 13 | 183 |
| 10 sec | 15 | 142 |

Concluding that 15 reciprocal seconds shear rate is sufficient to allow the paint discussed to be used at a bodyshop. This figure will be quoted throughout the experimental as the minimum shear rate applied to represent the viscosity $V_2$.

EXPERIMENT 2

A number of paints containing a variety of pigment types which are commonly used in the compositions of a refinish mixing scheme were selected and rheology measurements taken. Each pigment type had a standard formulation as is currently sold by ICI Autocolor (all P*-** numbers relate to currently available Autocolor products) and a second sample which contains a level of rheology agent which is associated with the paint having the claimed rheology profile and therefore does not require periodic mixing.

The even numbered samples are the standard paint compositions which are currently used on a periodically stirred mixing scheme and the odd numbered samples are a selection of base paints which could be used to make up a mixing scheme which negates the requirement for periodical mixing. Viscosity measurements were taken using a Bohlin CVO 120 air bearing instrument with Peltier electronic temperature control with the 4°/40 mm cone and temperature mode set at 20° C. All samples had remained undisturbed for a period of at least two weeks at 20° C. before the measurements were taken.

All measurement values were taken at a shear rate of $10^{-3}$ $s^{-1}$. This instrument being a controlled stress Bohlin, needs to be set over a controlled stress range such that shear rates of $10^{-3}$ $s^{-1}$ are obtained.

Method for Viscosity Measurements Before Shearing (Vis Pre-S Pa(s) [$V_1$])

Test Conditions
Temperature 20° C.
Initial delay 2 minute.
Log Ramp sweep from 0.01 Pa to 5 Pa (shear stress) over 120 seconds.
No. of readings=30
Pre-shear and yield analysis options set to off.

Method for Viscosity Measurements After $15^1$ $s^{-1}$ Shear (Vis Post-S Pa(s) [$V_2$])

Test Conditions
Temperature 20° C.
Controlled shear stress to give results for:—
Pre-shear option set for $15^1$ $s^{-1}$ for 10 seconds.
Immediately measure Log ramp sweep from 0.01 to 10 Pa over 120 seconds.
No of readings=30
Yield analysis options set to off.
Rhe (A)=Byk 410 90% solution from Byk Chemie in n-methyl-2-pyrrolidone (% added based on weight of the base paint).
Rhe (B)=Solthix 250 as supplied by Avecia (% added based on weight of the base paint).
Visc Pre-S=Viscosty before shear in Pa (s).
Visc Post-S=Viscosity after shear in Pa (s).
% of V1=V2 expressed as a % of V1.
% Recov.=% recovery of viscosity after 24 hours

TABLE 3

| Sample | Code | Pigment Type | Rhe (A) | Rhe (B) | Visc Pre-S Pa(s) ($V_1$) | Visc Post-S Pa(s) ($V_2$) | % of V1 |
|---|---|---|---|---|---|---|---|
| Sample 2 | P426-PP08 | Coarse Pearl | | | 8 | 6 | 25 |
| Sample 3 | P426-PP08 | Coarse Pearl | 0.66 | | 418 | 203 | 51 |
| Sample 4 | P420-907 | Red Oxide | | | 0.65 | 0.62 | 1.95 |
| Sample 5 | P420-907 | Red Oxide | 0.33 | | 234 | 51 | 78.2 |
| Sample 6 | P425-985 | Fine Aluminium | | | 28 | 10 | 64.28 |
| Sample 7 | P425-985 | Fine Aluminium | 0.33 | | 297 | 90 | 69.36 |
| Sample 8 | P426-PP62 | Fine Pearl | | | 46 | 17 | 63.04 |
| Sample 9 | P426-PP62 | Fine Pearl | 0.66 | | 629 | 328 | 47.85 |
| Sample 10 | P425-900 | Super White | | | 30 | 14 | 53.33 |
| Sample 11 | P425-900 | Super White | 0.11 | 0.5 | 561 | 207 | 63.1 |
| Sample 12 | P425-989 | Coarse Aluminium | | | 10 | 5 | 50 |
| Sample 13 | P425-989 | Coarse Aluminium | 0.33 | | 123 | 26.6 | 78.37 |
| Sample 14 | P420-905 | Yellow Oxide | | | 1.1 | 0.9 | 18.18 |
| Sample 15 | P420-905 | Yellow Oxide | 0.44 | | 382 | 104 | 72.77 |
| Sample 16 | P429-937 | Pale Yellow | | | 4.4 | 1.4 | 68.18 |
| Sample 17 | P429-937 | Pale Yellow | 0.11 | 0.5 | 312 | 68 | 78.2 |
| Sample 18 | P425-925 | Scarlet Chrome | | | 5.8 | 3.8 | 34.48 |
| Sample 19 | P425-925 | Scarlet Chrome | 0.014 | 0.062 | 273 | 91.5 | 66.48 |
| Sample 20 | P425-927 | Lemon Chrome | | | 64.1 | 40.3 | 37.12 |
| Sample 21 | P425-927 | Lemon Chrome | 0.014 | 0.062 | 159 | 44 | 72.32 |
| Sample 22 | P472-KT01 | Orange Yellow | | | 0.9 | 0.86 | 4.44 |
| Sample 23 | P472-KT01 | Orange Yellow | 0.66 | | 246 | 84 | 65.85 |

All odd numbered samples exhibit the claimed rheology profile Pre, Post shear, % drop in viscosity and viscosity recovery times are also within the claimed range.

EXPERIMENT 3

Samples 2 to 5, 16 and 17 were thoroughly mixed until homogeneous and then left undisturbed for 3 months at a constant temperature of 25° C. After this period of time the color strength at the top and bottom of the cans were measured by removing samples carefully from bulk after 0 and 4 inversions and mixing with an appropriate base color which was kept as a constant e.g. black or white. The color measurements were made using a Macbeth Colour-Eye 7000. The concentrations were measured after 0 and 4 can inversions. An inversion being described as a 180 inversion of the can in a motion similar to shaking.

The colour measurements were determined using a MACBETH CE7000 spectrophotometer, the instrument was set to include the Specular componant. In-house software calculated the Tristimulus XYZ values (illuminant C/2 Deg Observer) from the reflectance values obtained from the spectrophotometer.

These XYZ values were in turn used to calculate the strength variation from a standard by means of the following equation.

$$\text{Strength} = \frac{EX_B + EY_B + EZ_B}{EX_S + EY_S + EZ_S}$$

$$\text{Where } EXB = \frac{((1-A)^{x \times 2})}{2A}$$

where A=normalised X=100X/ΣX
X=Tristimulus X of batch and ΣX=sum of tristimulus weighting factors for X.

The above is repeated for the other 5 terms: $EY_B, EZ_B, EX_S, EY_S$ and $EZ_S$.

B indicates batch
S indicates Standard

TABLE 4

|  | 0 Inversions | 4 Inversions |
|---|---|---|
| Sample 2 | | |
| Colour Strength @ top of can | 56.69 | 98.09 |
| Colour Strength @ bottom of can | 100.99 | 107.1 |
| Sample 3 | | |
| Colour Strength @ top of can | 97.84 | 98.67 |
| Colour Strength @ bottom of can | 100.99 | 100.98 |
| Sample 4 | | |
| Colour Strength @ top of can | 2.64 | 22.58 |
| Colour Strength @ bottom of can | 122.43 | 136.63 |
| Sample 5 | | |
| Colour Strength @ top of can | 94.9 | 90.18 |
| Colour Strength @ bottom of can | 99.05 | 97.58 |
| Sample 16 | | |
| Colour Strength @ top of can | 91.67 | 76.49 |
| Colour Strength @ bottom of can | 147.13 | 130.18 |
| Sample 17 | | |
| Colour Strength @ top of can | 93.4 | 95.91 |
| Colour Strength @ bottom of can | 102.25 | 96.51 |

The conclusions being that the pigment has settled in Samples 2, 4 and 16 which do not have the rheology profile claimed. Samples 3, 5 and 17 however have the specified rheology and no settlement is evident.

EXPERIMENT 4

The following table shows the recovery profile of P425-900 available from ICI Autocolor with two separate thixotropic agents.

Method for Viscosity Recovery Measurements After $15^1 \text{ s}^{-1}$ Shear (Visc Post-S Pa (s) $[V_3]$)

Test Conditions
Temperature 20° C.
Controlled shear stress to give results for:—
Immediately measure Log ramp sweep from 0.01 to 10 Pa over 120 seconds.
No of readings=30
Yield analysis options set to off.
$V_3$ was measured after 1 hour, 2 hours, 4 hours and 24 hours respectively at rest.

TABLE 5

| | Visc Pre-S $V_1$ (Pa s) | Visc Post-S $V_2$ (Pa s) | $V_3$ 1 hour (Pa s) | $V_3$ 2 hours (Pa s) | $V_3$ 4 hours (Pa s) | $V_3$ 24 hours (Pa s) | % of $V_2$ @ 24 hours |
|---|---|---|---|---|---|---|---|
| 0.33% Rhe (A) | 408 | 108 | 185 | 184 | 195 | 199 | 184 |
| 0.3% Rhe (B) | 310 | 100 | | | | 213 | 213 |

EXPERIMENT 5

To show that the performance of the refinish coating compositions comprising base paint compositions which fit the rheological profile are equal if not superior to the standard paint systems used in the refinish market today a selection of car bonnets were completely re-sprayed using identical primers and processes with the topcoat composition differing.

A standard topcoat comprising base paint compositions which fit the rheological profile (and have not been periodically stirred) are sprayed and front-end properties of 20° gloss and distinction of image are compared. It must be pointed out at this point that the paints produced from a mixing scheme will generally contain a recommended level of blending clear in order for the paint to be applied by spray method. Therefore the Theological profiles of real paints as opposed to solely the rheology controlled base paint compositions may not fit into the claims.

The car bonnets are prepared using P180 DA discs supplied by 3M. P565-713 Chromate Free Etch primer was activated with P275-210 in a 1:1 ratio and applied to a film thickness of 25 microns in 2 single coats with a 5 minute flash off in between coats. This was air dried for 15 minutes before P565-888 Fast High Build Surfacer was activated with P210-832 and P850-1492 in a 5:1:15% (15% being taken as 15% of the paint and hardener volume. This use of % additions during activation will be used throughout) volume activation ratio. 2 coats were applied to give a 100 micron film thickness with a 5 minutes flash off period between coats. The bonnets were stoved in an oven for 20 minutes at 60°.

The primer was then flatted using P360 DA discs as supplied by 3M and wiped down with P850-1402 Spirit wipe.

The following topcoat systems were applied over the Fast High Build Surfacer:

Basic Sample 10 and Sample 11 from Experiment 2 were blended with 50% P190-376 (hydroxy acrylic blending clear) in order to provide a system which is representative of a color which could be applied in the refinish market after activation and thinning using P210-798 and P850-1492 in a 3:1:10% volume mixing ratio. As previously stated a blending clear is frequently used in many refinish color lines.

Basic Sample 16 and Sample 17 from Experiment 2 were activated and thinned using P210-798 and P850-1492 in a 3:1:10% volume mixing ratio and applied over the previously prepared car bonnets in two full single coats with a 5 minute flash off period between coats.

Basic Sample 20 and Sample 21 from Experiment 2 blended and thinned with 75% P190-376 (acrylic blending clear) in order to provide a system which is representative of a color which could be applied in the refinish market. This was activated and thinned using P210-798 and P850-1492 in a 3:1:10% volume mixing ratio and applied over the previously prepared car bonnets in two full single coats with a 5 minute flash off period between coats.

P422-XLP9 (silver basecoat) was made up from a standard stirred mixing scheme, Sample 24, as from formulation on microfiche. As follows:

| | |
|---|---|
| P425-989 | 535 g |
| P420-933 | 10.0 g |
| P420-982 | 1.0 g |
| P425-900 | 4.0 g |
| P420-938 | 350 g |
| P192-528 | 100.0 g |

Also an identical formulation using rheology controlled base paint compositions from a non stirred basics mixing scheme of the present invention was prepared Sample 25.

These samples were thinned in a 1:1 volume mixing ratio with P850-1492 and applied in 2 single coats with 5 minutes between coats followed by a light coat for even metallic appearance. This basecoat was coated with P190-643:P210-854:P850-1692 in a 4:2:1 volume mixing ratio in 2 coats with 5 minutes between coats to give a 50 micron film build.

P420-TGX4 (orange single layer solid colour), Sample 26, was made up from a standard stirred mixing scheme as from formulation from microfiche.

| | |
|---|---|
| P420-983 | 488 g |
| P425-925 | 55.1 g |
| P420-904RT | 12.3 g |
| P425-900 | 109 g |
| P190-376 | 366.7 g |

Also an identical formulation using rheology controlled base paint compositions from a non stirred basics mixing scheme of the present invention was prepared, Sample 27. These samples were activated at 3:1:10% volume mixing ratio as P420-TGX4:P210-798:P850-1492 system two single coats followed by a double coat application with 5 minutes between.

P420-5XF8 (white single layer solid colour), Sample 28 was made up from a standard stirred mixing scheme as from formulation from microfiche as follows:

| | |
|---|---|
| P425-900 | 1052.1 g |
| P420-918RT | 3.3 g |
| P425-927 | 1.6 g |
| P420-904RT | 38.9 g |
| P190-376 | 161.9 g |

Also an identical formulation using rheology controlled base paint compositions from a non stirred basics mixing scheme of the present invention was prepared, Sample 29. These samples were activated at 3:1:10% volume mixing ratio as P420-5XF8:P210-798:P850-1492 system two single coats followed by a double coat application with 5 minutes between.

P420-KJC6 (yellow solid colour), Sample 30, was made up from a standard stirred mixing scheme as from formulation from microfiche as follows:

| | |
|---|---|
| P425-927 | 863.9 g |
| P420-983 | 26.4 g |
| P420904RT | 15.9 g |
| P425-900 | 176.4 g |
| P190-376 | 176.4 g |

Also an identical formulation using rheology controlled base paint compositions from a non stirred basics mixing scheme of the present invention was prepared, Sample 31. These samples were activated at 3:1:10% volume mixing ratio with P420-KJC6:P210-798:P850-1492 system two single coats followed by a double coat application with 5 minutes between coats.

P421-XRY4 (single layer metallic), Sample 32, was made up from a standard stirred mixing scheme as from formulation from microfiche as follows:

| | |
|---|---|
| P421-993 | 419.5 g |
| P425-900 | 12.9 g |
| P425-950 | 2.0 g |
| P420-942 | 6.0 g |
| P420-977 | 372.9 g |
| P190-376 | 178.5 g |

Also an identical formulation using rheology controlled base paint compositions from a non stirred basics mixing scheme of the present invention was prepared, Sample 33. These samples were activated at 2:1:1 volume mixing ratio with P421-XRY4:P210-798:P850-1492 system two single coats followed by a double coat application with 5 minutes between coats. For each of the car bonnets prepared above 30 image clarity readings using a Suga Image Clarity Meter type HA-ICM were taken and averaged. For each of the car bonnets prepared above 15 readings of 20° gloss measurements were taken on a Sheen Tri-Microgloss 20-60-85 instrument and averaged.

Results are shown below.

From the results shown the image and clarity readings from the colour systems consisting of the basics with the claimed rheology are equal if not superior to the identical systems consisting of basics which do not fall within the rheology profiles claimed.

TABLE 6

| Sample | Suga Image Clarity | 20 Degree Gloss |
|---|---|---|
| Sample 10 | 93.7 | 83 |
| Sample 11 | 99.4 | 81 |
| Sample 16 | 75.7 | 76.3 |
| Sample 17 | 73 | 75 |
| Sample 20 | 76.2 | 83 |
| Sample 21 | 79.5 | 81 |
| Sample 24 | 9.27 | 78.6 |
| Sample 25 | 18.87 | 79.9 |
| Sample 26 | 39.53 | 80.2 |
| Sample 27 | 43.2 | 79.2 |
| Sample 28 | 81.2 | 77.48 |
| Sample 29 | 85.9 | 78.3 |
| Sample 30 | 77 | 78.69 |
| Sample 31 | 85.23 | 79.38 |
| Sample 32 | 53.37 | 76.4 |
| Sample 33 | 45.13 | 75.4 |

The invention claimed is:

1. A mixing scheme comprising:
a plurality of pigmented base paint compositions having defined colors and comprising at least one rheology controlled base paint composition comprising at least one pigment selected from the group consisting of inorganic pigments, di-keto-pyrrolo-pyrrole pigments, organic liquid crystal pigments and carbon black, wherein the at least one rheology controlled base paint composition comprises a thixotropic agent present and in an amount to provide a rheology profile comprising:
   (1) an initial viscosity $V_1$ at 20° C. of 65 Pa s or greater when measured at a shear rate of $10^{-3}$ $s^{-1}$,
   (2) a viscosity $V_2$ of 700 Pa s or less and less than or equal to 70% of $V_1$ at 20° C. when measured at a shear rate of $10^{-3}$ $s^{-1}$ immediately after subjecting to a shear rate of at least 15 $s^{-1}$; and
   (3) a viscosity $V_3$ of at least 140% of $V_2$ and at least 55 Pa s within 24 hours at rest after being subjected to a shear rate of at least 15 $s^{-1}$,
   wherein the resulting base paint compositions are resistant to settlement as a result of this rheology profile.

2. The mixing scheme of claim 1, wherein the initial viscosity $V_1$ at 20° when measured at a shear rate of $10^{-3}$ $s^1$ is above 80 Pa s.

3. The mixing scheme of claim 1, wherein the viscosity $V_2$ is 700 Pa s or less at 20° C. when measured at a shear rate of $10^{-3}$ $s^{-1}$.

4. The mixing scheme of claim 1, wherein the viscosity $V_3$ is at least 140% of $V_2$ within 12 hours after being subjected to shear and is 80 Pa s or greater.

5. The mixing scheme of claim 1, wherein the at least one pigment is selected from:
   (1) pigments which are classed as Pigment White in the Colour Index classification published by the Society of Dyers and Colourists, American Association of Textile Chemists and Colourists;
   (2) pigments which are classed as Pigment Black in the Colour Index classification published by the Society of Dyers and Colourists, American Association of Textile Chemists and Colourists;
   (3) pigments which are classed as Pigment Metal in the Colour Index classification published by the Society of Dyers and Colourists, American Association of Textile Chemists and Colourists;
   (4) thin platelets, made of natural mica or synthetically produced substrates, of low refractive index which are coated with thin layers of titanium oxide and/or other metal oxides with high refractive index;
   (5) iron oxide type pigments which are classed as Pigment Red in the Colour Index classification published by the Society of Dyers and Colourists, American Association of Textile Chemists and Colourists;
   (6) iron oxide type pigments which are classed as Pigment Yellow in the Colour Index classification published by the Society of Dyers and Colourists, American Association of Textile Chemists and Colourists;
   (7) lead chromate type pigments which are classed as Pigment Red in the Colour Index classification published by the Society of Dyers and Colourists, American Association of Textile Chemists and Colourists;
   (8) lead chromate type pigments which are classed as Pigment Yellow in the Colour Index classification published by the Society of Dyers and Colourists, American Association of Textile Chemists and Colourists;
   (9) bismuth vanadate pigments which are classed as Pigment Yellow in the Colour Index classification published by the Society of Dyers and Colourists, American Association of Textile Chemists and Colourists;
   (10) di-keto-pyrrolo-pyrrole pigments which are classed as Pigment Red in the Colour Index classification published by the Society of Dyers and Colourists, American Association of Textile Chemists and Colourists;
   (11) special effect pigments selected from organic liquid crystals, pigmented coated silica particles, pigmented coated aluminum oxide flakes, vacuum metallized flake, polyester holographic metallized flakes and metallized glass flakes.

6. The mixing scheme of claim 5, comprising 2, 3, 4, 5, 6, 7 or more rheology controlled base paint compositions.

7. The mixing scheme of claim 1, wherein the thixotropic agent is selected from hydrogenated castor oils, pyrogenic silica, and polyureas.

8. The mixing scheme of claim 7, wherein the thixotropic agent is a polyurea that is selected from the reaction product of a polyisocyanate, a primary or secondary monoamine and optionally a primary and/or secondary diamine and the reaction product of a primary and/or secondary diamine, a monoisocyanate and optionally a polyisocyanate.

9. The mixing scheme of claim 1, wherein the pigmented base composition comprises, in addition to color providing pigments, pigments designed to give visual effects selected from metallic effects and pearlescent effects.

10. The mixing scheme of claim 1, wherein the pigmented and the non-pigmented base compositions comprise different or identical binders selected from acrylic resins, polyester resins, polyurethane resins, epoxy resins, polyether resins and alkyd resins, optionally a crosslinker and one or more solvents.

11. A process for preparing a refinish automotive coating composition comprising:
   (a) selecting a predetermined number of pigmented base paint compositions in predetermined amounts, whereby at least one of the pigmented base paint composition is a rheology controlled base paint composition as defined in any of the preceding claims and optionally a predetermined number of non-pigmented base paint compositions from the mixing scheme according to any of the preceding claims so that the refinish coating composition matches a predetermined color after mixing; and
   (b) mixing the selected base paint compositions.

12. A refinish automotive coating composition obtained by the process of claim 11.

13. A process for coating a substrate comprising applying the refinish coating composition of claim 12 onto a substrate and allowing or causing the coating to dry or cure.

14. The process of claim 13 wherein the substrate is a motor vehicle or a part thereof.

15. A coated substrate obtained by the process of claim 13.

16. The mixing scheme of claim 1, further comprising (B) one or more non-pigmented base paint compositions.

* * * * *

UNITED STATES PATENT AND TRADEMARK OFFICE
CERTIFICATE OF CORRECTION

PATENT NO. : 7,288,584 B2  Page 1 of 1
APPLICATION NO. : 10/351713
DATED : October 30, 2007
INVENTOR(S) : William James Highcock, Graham Stuart Kay and David Robert Fenn It is certified that error appears in the above-identified patent and that said Letters Patent is hereby corrected as shown below:

Column 19, Line 24 (Claim 2)
" 20° " should be -- 20° C. --

Column 20, Line 23 (Claim 7)
"silica, and polyureas." should be -- silica, modified montmorillonite clays and polyureas. --

Signed and Sealed this

Twenty Second Day of April, 2008

JON W. DUDAS
*Director of the United States Patent and Trademark Office*